United States Patent [19]
Nazarathy et al.

[11] Patent Number: 4,843,350
[45] Date of Patent: Jun. 27, 1989

[54] CODED SEQUENCE TRAVELLING-WAVE OPTICAL MODULATOR

[75] Inventors: Moshe Nazarathy, Mountain View; David W. Dolfi, Los Altos; Roger L. Jungerman, Petaluma, all of Calif.

[73] Assignee: Hewlett-Packard Company, Palo Alto, Calif.

[21] Appl. No.: 4,996

[22] Filed: Jan. 20, 1987

[51] Int. Cl.[4] .................. H01S 3/00; G02B 6/26
[52] U.S. Cl. .................. 332/7.51; 350/96.14; 350/376; 455/616
[58] Field of Search .................. 332/7.51; 350/96.11, 350/96.14, 376.1, 392; 455/616; 356/323, 351

[56] References Cited

U.S. PATENT DOCUMENTS

H484  6/1988  Holliday ..................... 342/201

OTHER PUBLICATIONS

Nazarathy et al. "Velocity-mismatch Compensation . . ."; J. Opt. Soc. Am. A., vol. 4, #6, pp. 1071–1079, 6/87.
Jung; K. M.; "Piezoelectric Multilayer Transducers . . ."; Ultrasonics, vol. 22, #2, pp. 61–68, 3/84, Abst. Only.
Electron. Lett., vol. 23, #4 pp. 172–174, 2/12/87 by Jungerman et al; "Coded Phase Reversal . . . ", Abst. only.
Nagarathy et al.; "Spread Spectrum Frequency . . . "; Abst. only. J. Lightwave Technol., vol. LT-5, #10, pp. 1433–1443, 10/87.
Holliday, A. M.; "Polarization Pulse Compression . . ."; abst., NTIS AD-A176635/1/XAB, 8/86, Tech. Report.
Maltese, P.; "Cross-Modulation . . . Matrix Displays"; Proc. S.I.D., vol. 216, #2, pp. 125–132, 1985. Abst. only.
A. Djupsjobacka, "Novel type of Broad-Band Traveling-Wave Integrated-Optic Modulator," Electron. Lett. 908–909 (1985).
D. Eraseme and M. G. F. Wilson "Analysis and Optimization of Integrated-Optic Traveling-Wave Modulators Using Periodic and Non-Periodic Phase Reversals," Opt. Quantum Electron. 18, 203–211 (1986).
D. Eraseme and M. G. F. Wilson "Time-Domain Analysis of Phase-Reversal Traveling-Wave Integrated-Optics Modulators," Electron. Lett. 19, 1024–1026 (1986).
R. L. Jungerman, D. W. Dolfi, C. A. Johnsen, and M. Nazarathy, "Coded Phase Reversal LiNbO3 Modulator with Bandwidth Greater than 20 GHz at 1.3. um Wavelength," Electron, Lett. 23, 172–176 (1987).
R. V. Schmidt and H. Kogelnik, "Electro-Optically Switched Coupler with Stepped Δβ Reversal Using Ti-Diffused LiNbO3 Waveguides," Appl. Phys. Lett. 503–506 (1976).
"Waveguide Electrooptic Modulators" by Rod C. Alferness; pp. 1121—1137.
"Velocity-Matching Techniques for Integrated Optic Traveling Wave Switch/Modulators" by Alferness, et al.; pp. 301–309.
"Novel Type of Broadband Travelling-Wave Integrated-Optic Modulator;" Electronics Letters, 9/26/85; vol. 21; No. 20 Phase Code Generators and Correlators; pp. 311–315.
"Complementary Series–IRE Transactions on Information Theory" by Golay, pp. 82–87.
Microwave Journal 1967 (Semi-Technical) "Pulse Sequences with Good Autocorrelation Properties"; pp. 63–67.

*Primary Examiner*—Nelson Moskowitz
*Attorney, Agent, or Firm*—John A. Frazzini

[57] ABSTRACT

A travelling wave modulator in which the phase velocity of a first wave is modulated by a second travelling wave. Means are provided to alter the polarity of the second wave in accordance with a pseudorandom code. Barker codes and Golay codes are particularly suitable for improving the bandwidth-to-voltage ratio of the modulator over a comparable conventional modulator.

10 Claims, 4 Drawing Sheets

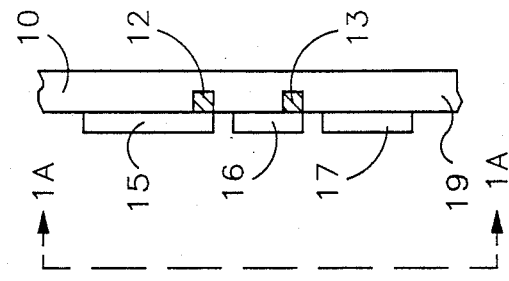
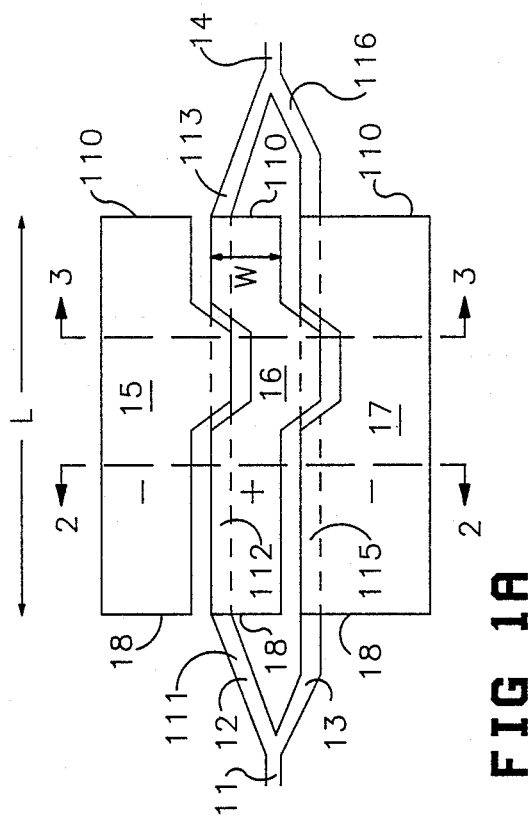
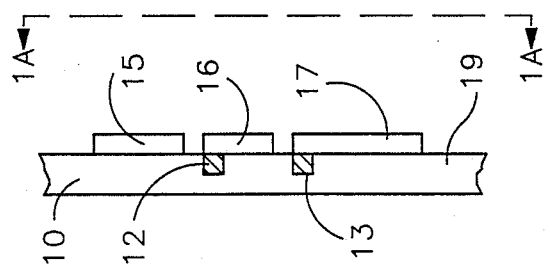
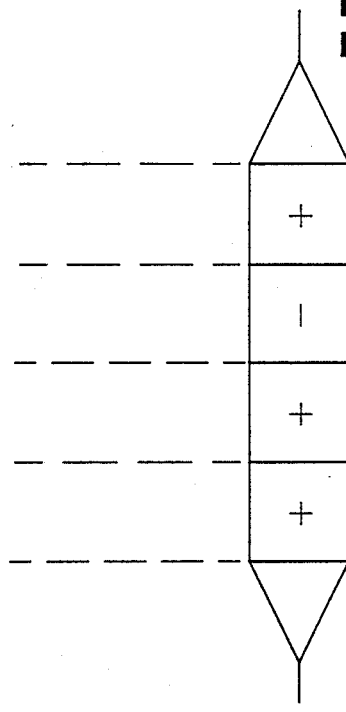
FIG 3
FIG 1A
FIG 1B
FIG 2

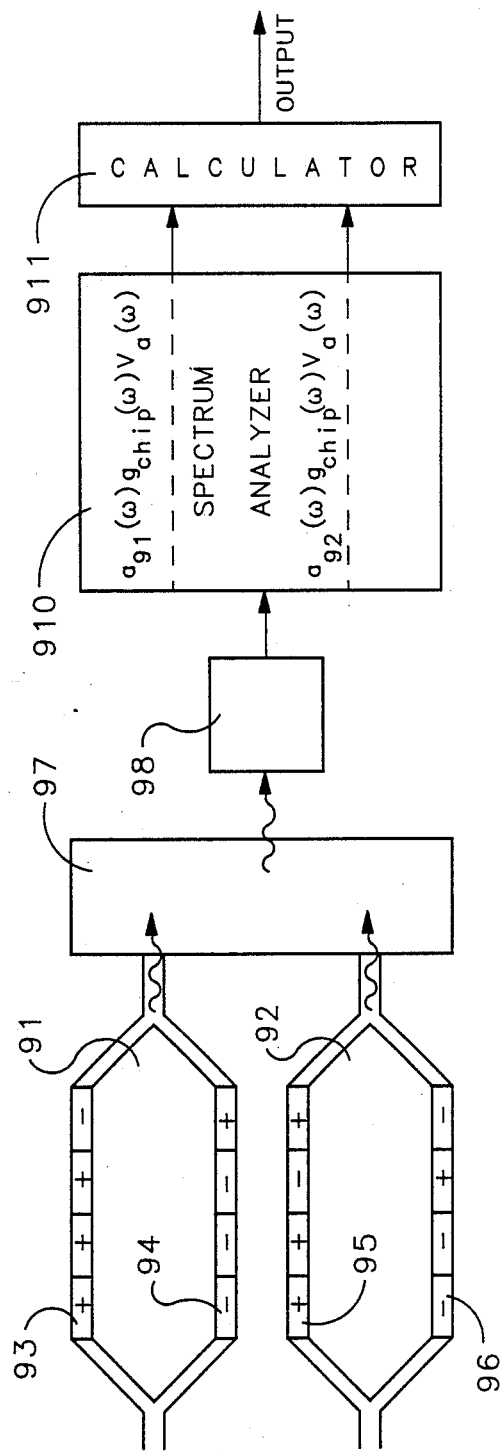
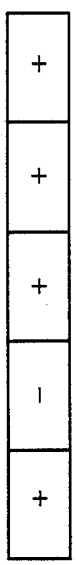
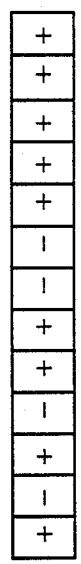
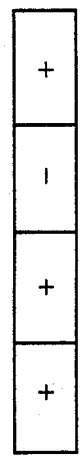

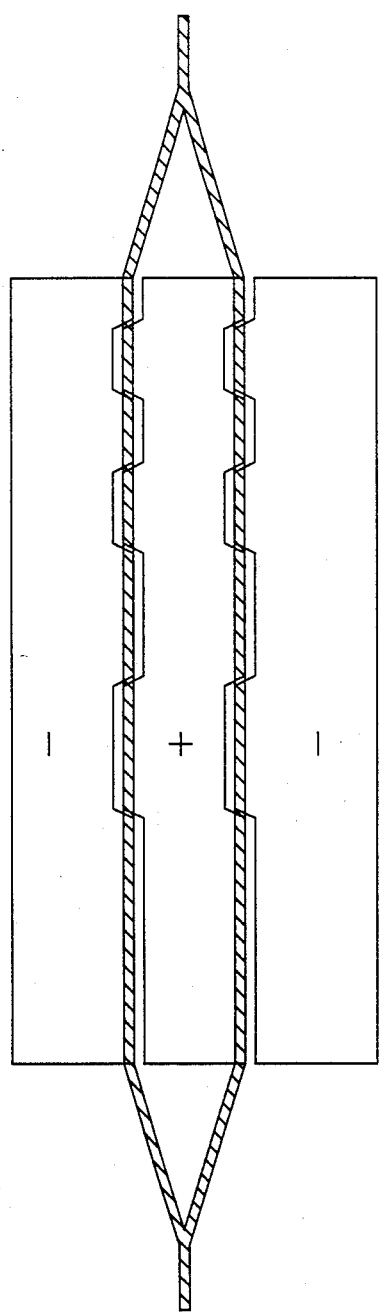

CODED SEQUENCE TRAVELLING-WAVE OPTICAL MODULATOR

BACKGROUND OF THE INVENTION

This invention relates in general to travelling-wave optical modulators and more particularly to travelling-wave modulators having an electrode structure that increases the bandwidth-to-drive-voltage ratio over conventional travelling-wave optical modulators. The structure of conventional optical modulators is discussed in chapter 14 of the text by Amnon Yariv entitled Quantum Electronics, 2nd Edition, John Wiley & Sons, Inc., 1975. In such modulators, optically transparent materials are used that, for a given direction of transmission of light in the material, exhibit an ordinary index of refraction $n_o$ for a first polarization of the light and exhibit an extraordinary index of refraction $n_e$ for a second polarization that is perpendicular to the first one. At least one of these indices of refraction is changeable in response to an applied voltage. The index of refraction can be changed by the applied voltage, for example, via the electrooptic effect or the photoelastic effect.

Each of these polarizations functions as a separate channel for transmission of light. Because the phase velocity of each of these channels is equal to the speed of light c divided by the index of refraction for that channel, the phase velocities for these two channels will generally be unequal. Since the phase of light at the output of the modulator is equal to the input phase plus $2*pi*f*L/v$ (where f is the is the frequency of the light, L is the length of the light path in the modulator and v is the phase velocity of the light), these modulators can be used to modulate the output phase of light in at least one of these channels. For sufficiently small applied voltages, the variation of phase velocity as a function of applied field is substantially linear so that the phase modulation is proportional to the applied voltage.

Phase modulation can be converted to amplitude modulation by interference of the light in one of these channels with another beam of light, such as the beam of light in the other channel. In such an amplitude modulator, the light in these two channels can be combined by a polarizer placed at the output of the modulator and orientated in a direction midway between the directions of polarization of the two channels. Alternatively, an interferometer, such as a Mach-Zehnder interferometer can be used to combine two beams of the same polarization to produce amplitude modulation (see, for example, Rod. C. Alferness, "Waveguide electro-optic modulators", IEEE transactions on microwave theory and techniques, Vol. MTT-30, pp. 1121-1137, 1982). In such a device, the two channels of propagation are physically distinct waveguides.

In the linear electrooptic modulators, for each of the channels, the relation of phase velocity to applied voltage depends on the direction of the associated electric field produced in the modulator. The phase shift is proportional to the magnitude of the electric field and to the length L of the light path through the modulator. When the applied electric field is parallel to the direction of transmission, the amount of phase shift is independent of the length for a given applied voltage. An applied field perpendicular to the direction of transmission is advantageous because the electrodes do not then interfere with the propagation of the optical beam and because the amount of modulation, for a given applied voltage, can be increased by increasing the length of the crystal.

For modulation frequencies high enough that the transit time of the optical beam through the crystal is on the order of or greater than the period of the modulator frequency, the amount of modulation is proportional to the time integral of the applied signal over the transit time of the beam. Over such transit time, negative values of the applied voltage will offset the effects of positive values. In order to avoid such cancellation, the voltage is applied as a travelling wave that travels in the same direction as the optical beam. If the velocity of the travelling wave applied voltage equals the velocity of the optical beam in the modulator, then a given segment of the optical beam is subjected to a constant applied electric field as it travels through the modulator.

Unfortunately, the group velocity of the applied voltage signal is generally not equal to the group velocity of the light in the modulator. This results because the group velocity (in the absence of dispersion) is equal to the speed of light c divided by the index of refraction of the medium and because the index of refraction for the frequencies of the applied voltage is different from the index of refraction for the frequencies of the optical signal. For example, in $LiNbO_3$ the index of refraction for an rf applied voltage is on the order of 4 whereas the index of refraction for optical frequencies is on the order of 2. As a result of this, a given segment of the optical beam does not experience a constant applied electric field. The effect of this can be easily seen for an optical signal $$V_o = A_o * e^{i(w_o t - k_o z)} \qquad (1)$$

having its phase modulated by an applied voltage $$V_a = A_a * e^{i(w_a t - k_a z)} \qquad (2)$$

The z axis has been chosen to lie along the direction of propagation of these two travelling waves and the point $z=0$ has been chosen to be at the input end of the modulator. The phase velocities of the optical beam and the applied voltage signal are $v_o = w_o/k_o$ and $v_a = w_a/k_a$, respectively. The portion of the optical beam that enters the modulator at time t is located at $$z = z_o(t') = v_o * (t' - t) \qquad (3)$$

at time t'. This portion of the optical field experiences at the point $(t', z(t'))$ a retardation proportional to the applied field at the point—namely $$V_a(t', z_o(t')) = A_a * e^{i[w_a t' - k_a * v_o * (t' - t)]} \qquad (4)$$

The total phase shift on this portion of the wave is equal to the time integral over $t'-t$ from $t'-t=0$ to $t_o$ where $t_o$ is the transit time for the optical beam to cross the modulator and is equal to $L*k_o/w_o$. The effect of this is that the retardation is reduced by the factor $$[e^{i(w_r t_o)} - 1]/i w_r t_o = e^{i(w_r t_o/2)} * sinc(w_r t_o/2) \qquad (5a)$$

where $$w_r = w_a - v_o * k_a = w_a * (1 - v_o/v_a) \qquad (5b)$$

compared to the retardation that would result if the velocities $v_o$ and $v_a$ were equal. This walkoff of the phase of the applied voltage signal relative to the phase of the optical signal thus produces a reduction factor that is dependent on the frequencies of both signals.

The sinc function first goes to zero when its argument $w_r*/t_o/2$ equals $\pm pi$. Using equation (5a), the first null occurs when $w_a = 2pi/(t_a - t_o) = 2pi/(L/v_a - L/v_o)$, where $t_a$ is the transit time for the microwave to cross the modulator. This shows that the bandwidth varies inversely with L. This means that the bandwidth can be increased by decreasing the length of the modulator. Unfortunately, reducing the length of the modulator equivalently reduces the time during which the applied voltage affects the optical signal so that the magnitude of the modulation varies inversely with the length L of the region of modulation. Therefore, in the variation of the length L, there is a tradeoff between the bandwidth and the magnitude of the applied voltage required to produce a given amount of phase change. A measure of the applied voltage needed in the modulator is the voltage $V_{pi}$ which is defined to be the value of the dc voltage needed to produce a phase change of pi in the output optical signal. The ratio of bandwidth (BW) and $V_{pi}$ is a figure of merit that is independent of the length of the modulation region. This bandwidth-voltage-ratio (BVR) is thus a useful figure of merit of the modulators.

In one technique of increasing the upper limit of the useful band of applied frequencies (see Rod. C. Alferness, et al, "Velocity-matching techniques for integrated optic travelling wave switch/modulators", *IEEE J. Quant. Electron*, vol. QE-20, pp. 301–309, 1984), the electrodes have a shape that periodically reverses the applied electric field in the modulator as a function of z. Such periodic field reversals are used to offset the negative portions of the relative phase between the applied signal and the optical signal. Unfortunately, this cancellation is complete only at one value of $w_r$, and, in addition, these periodic filed reversals degrade the low frequency performance. In effect, these periodic field reversals serve to shift the effective band upward in frequency without broadening the width of the band.

In another modulator (see A. Djupsjobacka, "Novel type of broadband travelling-wave integrated-optic modulator", *Electronics Letters*, pp. 908–909, 1985) there is only a single phase reversal produced by laterally offsetting the electrodes three-fourths of the distance along the modulator. It is asserted incorrectly that this design acts like a low pass filter and a high pass filter in series, whereas in fact it functions as a low pass filter and a high pass filter in parallel. Unfortunately, the increase in bandwidth with this structure is offset by a voltage reduction factor of 2. Thus, this device exhibits a reduced bandwidth-voltage-ratio (BVR) relative to a conventional Mach-Zehnder modulator having no polarity reversals. It would be useful to have a design that increases the bandwidth-voltage-ratio (BVR) and also retains a low value of $V_{pi}$ down to dc applied voltages.

SUMMARY OF THE INVENTION

In accordance with the disclosed preferred embodiment, a modulator is presented that includes an electrode structure that increases the effective bandwidth of applied voltages and retains a low value of $v_{pi}$ down to dc applied voltage. This invention is illustrated in the case of electrooptic modulation of an optical frequency, but the field reversal pattern produced by the electrodes has applicability to the modulation of any first type travelling wave signal by application of a second type travelling wave signal.

In the disclosed electrooptic modulators, the structure of the electrodes used to apply a voltage signal to the modulator introduces field reversals into the applied electric field in a pattern defined by a spread spectrum pseudorandom code. Barker Codes of length 4, 5 and 13 have been particularly effective in extending the bandwidth while retaining effective modulation down to dc applied voltages. In another embodiment, a Golay pair is used to define the pattern of field reversals in a pair of optical modulators. The light from both modulators is then detected and combined to produce modulation over an increased bandwidth.

Two particular embodiments utilize an x-cut $LiNbO_3$ and a z-cut $LiNbO_3$ crystal, respectively. In the first embodiment, the electrodes are positioned relative to the optical waveguide so that the electric field produced in the optical waveguide is substantially parallel to the surface of the modulator. In the second embodiment, the electrodes are positioned relative to the optical waveguide so that the electric field produced in the optical waveguide is substantially perpendicular to the surface of the modulator.

DESCRIPTION OF THE FIGURES

FIG. 1A is a Mach-Zehnder type amplitude modulator having electrodes configured to produce phase reversals in the applied signal in accordance with a spread spectrum pseudorandom code sequence.

FIG. 1B illustrates the correspondence between the polarity reversals in the modulator of FIG. 1B and the Barker Code defining those reversals.

FIGS. 2 and 3 are cross-sections of the modulator of FIG. 1.

In FIGS. 8A–8D are presented the four Barker codes that produce a significantly improved bandwidth-to-voltage ratio and reasonable modulation at dc applied voltage.

FIG. 9 is a modulator utilizing a pair of Mach-Zehnder type modulators having electrodes that produce reversals in accordance with a Golay pair of length 4.

FIG. 10 illustrates the electrode pattern for a modulator using an x-cut $LiNbO_3$ substrate and a Barker code of length 13.

FIG. 11 illustrates the generation of a generalized Barker code from a pair of Barker codes.

DESCRIPTION OF THE PREFERRED EMBODIMENT

Figure 4:
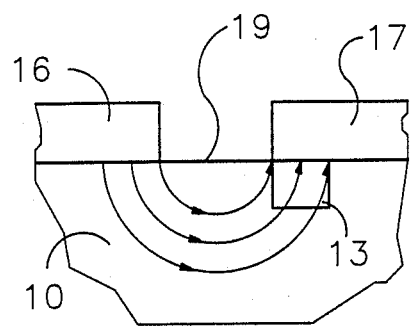
FIG. 4 is an exploded view of a portion of FIG. 2 illustrating the placement of waveguide branch 13 relative to the electrodes for a z-cut $LiNbO_3$ substrate.

In FIGS. 1–3 are shown a top view and two cross-sectional views of a mach-Zehnder type travelling wave electrooptic amplitude modulator utilizing electrodes that are configured to produce a pattern of electric field reversals in the optical paths of the modulator in accordance with a spread spectrum pseudorandom code. This electrode structure results in a large increase in bandwidth while preserving operation down to dc applied voltages. The substrate 10 of the modulator is a material that transmits optical waves without significant loss and that exhibits at least one index of refraction that is variable in response to an applied electric field. A particularly suitable choice for the substrate in $LiNbO_3$ because it exhibits a particularly strong electrooptic response. The length L of the electrodes is on the order of 11 centimeters.

An optical waveguide 11 is formed in the substrate, for example, by doping the substrate with titanium within the waveguide region of the substrate. Titanium is used as the dopant because it fits easily into the crystal lattice, it diffuses well into the crystal and it increases the indices of refraction so that the doped region functions as an optical waveguide. In the embodiment shown in FIG. 1, waveguide 11 divides into two branches 12 and 13 which recombine into an output path 14. These waveguide segments have cross-sectional dimensions on the order of 5 microns. This structure is known as a Mach-Zehnder modulator and is used to convert the phase modulation produced in branches 12 and 13 into amplitude modulation in output path 14. Typically, branches 12 and 13 will each exhibit two indices of refraction along two principal axis directions perpendicular to the direction of propagation of light in those paths. The light input into waveguide 11 is polarized so that the light in each of branches 12 and 13 is along one of these principal axes. Since each polarization direction functions like a separate channel, if the polarization were not along one of these principal axes, the light beam would travel in both channels at different speeds, thereby producing additional, unwanted phase variations.

A set of electrodes 15–17, overlays portions of branches 12 and 13 in a region in which these two branches are parallel. An applied voltage $V_a$ is applied to these electrodes in such a way that electrode 16 is at the voltage $V_a$ above the voltage of electrodes 15 and 17. These polarities and the locations of the electrodes produce electric fields between the electrodes that are in opposite directions in branches 12 and 13. Thus, when the phase is being retarded in one branch, it is being advanced in the other branch. This push-pull modulation relationship between the two branches produces in output path 14 an amplitude modulation proportional to twice the phase modulation produced in each of branches 12 and 13.

FIG. 4 is an enlarged view of a portion of FIG. 2, illustrating the electric fields produced in substrate 10 and waveguide 13 by the applied voltage when electrode 16 is more electropositive than electrode 17. It should be noticed that waveguide 13 is located under the end of one of the electrodes so that the electric field within waveguide 13 is substantially perpendicular to the top surface of substrate 10. In this embodiment, a z-cut $LiNbO_3$ crystal is used because in such a crystal the index of refraction of the crystal is more strongly affected by electric fields perpendicular to the top surface 19 of the substrate than to electric fields in other directions. One advantage of this embodiment is that the gap between the electrodes can be quite small (on the order of a few microns) so that a strong electric field is produced by a modest applied voltage on the order of 10 volts. Another advantage is that the electric field in branch 13 can be reversed in polarity by translating electrodes 16 and 17 laterally relative to waveguide 13 so that waveguide 13 is located under the edge of electrode 16. Thus, the electrode shapes in FIG. 1 result in waveguide 13 being located under the edge of electrode 17 in the cross-section shown in FIG. 2 and results in waveguide 13 being located under the edge of electrode 16 in the cross-section shown in FIG 3.

Figure 5:
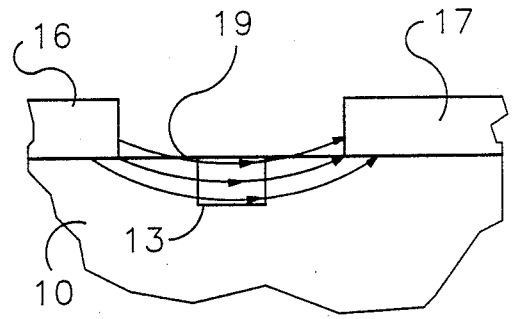
FIG. 5 is an exploded view of a cross-section of a Mach-Zehnder modulator illustrating the placement of waveguide branch 13 relative to the electrodes for an x-cut $LiNbO_3$ substrate.
Figure 6:
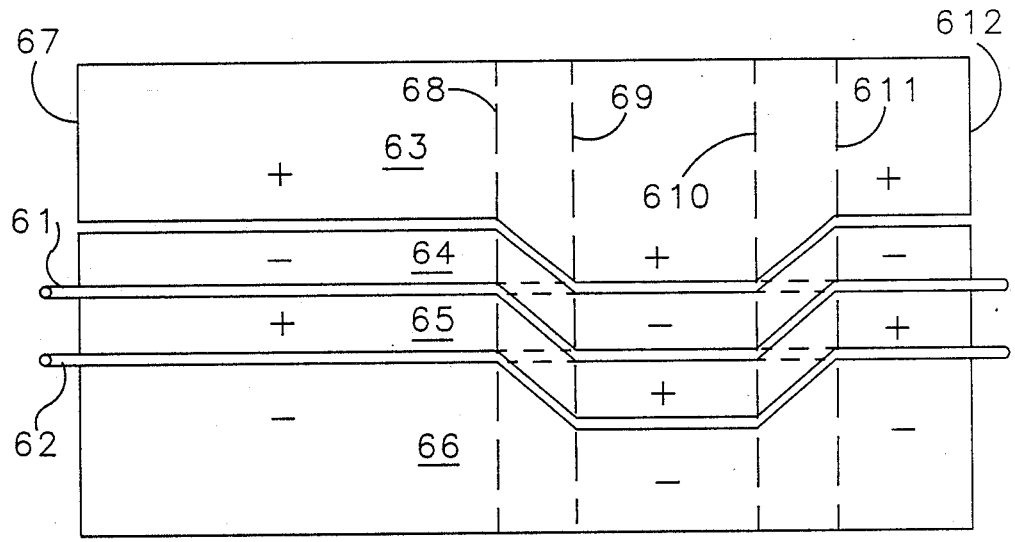
FIG. 6 illustrates an electrode pattern suitable for introducing polarity reversals in the applied electric field in a Mach-Zehnder type amplitude modulator using a z-cut $LiNbO_3$.

In an alternative embodiment illustrated in FIG. 5, the substrate is an x-cut $LiNbO_3$ crystal. In such a cut, the indices of refraction are most strongly affected by electric fields parallel to the top surface 19 of the substrate. Therefore, in this embodiment, the electrodes are more widely spaced and the waveguides are located substantially midway in the gaps between the electrodes so that the electric fields within the optical waveguides are substantially parallel to top surface 19. Although the gaps in such embodiments will typically be larger than in the embodiment of FIGS. 1–4, these gaps will still be on the order of several microns so that strong electric fields are produced for a modest applied voltage on the order of several volts. A disadvantage of this cut is that the polarity of the electric field in the waveguide branches cannot be straightwardly reversed by a lateral offset of all electrodes as in FIG. 1. As can be seen from FIG. 5, a lateral translation of electrodes 16 and 17 will not produce a polarity reversal. Instead, the positions of electrodes 16 and 17 must be interchanged in order to reverse the polarity of the electric field in waveguide branch 13. Such a waveguide structure is shown in FIG. 6. This embodiment has four electrodes 63–66 instead of three as in FIG. 1. As in FIG. 1, in this device an optical waveguide splits into a branch 61 and a branch 62 in each of which the optical wave is phase modulated. Electrodes 63–66 are configured to produce the opposite polarity of phase modulation in branch 61 as in branch 62 so that there is the same type of push-pull phase modulation as in FIG. 1. In the region between input end 67 and dashed line 68 and in the region dashed line 611 and output end 612, the electric field in branch 61 is produced by the voltage difference between electrodes 64 and 65 and the electric field in branch 62 is produced by the voltage difference between electrodes 65 and 66. In the region between dashed line 69 and dashed line 610, the electric filed in branch 61 is produced by the voltage difference between electrodes 63 and 64 and the electric field in branch 62 is produced by the voltage difference between electrodes 64 and 65.

In the embodiment of FIGS. 1–3, $V_a$ is applied to an input end 18 of electrodes 15–17 and produces travelling waves that travel along the electrodes parallel to branches 12 and 13. The other end of each electrode is terminated in a matched impedance to avoid reflections from that end. As discussed in the Background of the Invention, the group velocities of these applied voltage travelling waves are typically unequal to the group velocity of the optical beams in the optical waveguides. As indicated in the Background of the Invention, the optical group velocity is on the order of half the speed of light and the group velocity of the applied voltage is on the order of one fourth the speed of light. Therefore, the shapes of the electrodes are selected to produce a set of polarity inversions that compensate for the walkoff between the phase of the electrical and optical signals in a way that increases the bandwidth and retains functional operation down to dc applied signals.

In order to achieve this increased bandwidth, the electrodes are divided into a set of N equal segments along their length and the polarity between the electrodes in these segments is selected in accordance with a spread spectrum pseudorandom code. This electrode structure is applicable not only to the Mach-Zehnder modulator, but is also applicable generally to phase modulators as well as to other types of amplitude modulators. In general, the amplitude modulators produce phase modulation in one beam and then interfere it with another beam, that may or may not be phase modulated, to produce amplitude modulation. The enhanced operation due to this electrode structure can be seen to result as follows.

The general concept is illustrated under the assumptions that dispersion effects, losses in the optical signal, losses in the applied voltage, and reflections in the electrodes at the output end of the modulator can be neglected. Models taking these factors into account indicate that these neglected effects will not in general qualitatively change these results.

In the end of waveguide 11 an optical signal $V_o$ of angular frequency $w_o$ is injected having, at that point, a time dependence $$V_o(t) = A_o(t) e^{iw_o t} \tag{6}$$

where $A_o(t)$ is the amplitude. This produces a travelling wave in waveguide 11 of phase velocity $V_o = w_o/k_o$ where $k_o$ is the wavenumber of this travelling wave. Half of this optical signal travels into branch 12 and the other half enters branch 13. The distance along each branch from the input end of waveguide 11 is indicated by the parameter z. Thus, in each of branches 12 and 13 the optical signal has the form $$V_o(t,z) = V_o(t - z/v_o) = A_o(t - z/v_o) * e^{i[w_o(t - z/v_o)]} \tag{7}$$

At end 18 of electrodes 15-17 an applied voltage $V_a(t)$ is applied. This produces a travelling wave voltage signal having a group velocity $v_a$. In the electrodes, the distance from end 18 will be represented by the parameter z. Thus, in the electrodes the applied voltage has the form $V_a(t - z/v_a)$.

Branch 12 consists of a section 112 located between ends 18 and 110 of the electrodes, section 111 between waveguide 11 and section 112, and section 113 between section 112 and waveguide 14. Likewise, branch 13 consists of sections 114–116 that are analogous to sections 111-113 of branch 12. The total length of branch 12, extending from the input end of waveguide 11 to the output end of waveguide 14 is denoted as $L_{12}$. Likewise, the total length of branch 13 is denoted as $L_{13}$. The lengths of sections 111-116 are denoted by $L_{111}$-$L_{116}$, respectively. As can be seen from FIG. 1, the lengths $L_{112}$ and $L_{115}$ are both equal to the length L of the electrodes. The transit time for the unmodulated optical signal to traverse the lengths $L_{12}$, $L_{13}$, and $L_{111}$-$L_{116}$ are denoted by $t_{12}$, $t_{13}$, and $t_{111}$-$t_{116}$, respectively. Because of these finite transit times, the optical signal at the output of waveguide 14 via branch 12 is $$(\tfrac{1}{2}) * V_o(t - L_{12}/v_o) = V(t - t_{12}) \tag{8}$$

Similarly, the optical signal at the output of waveguide 14 via branch 13 is $$(\tfrac{1}{2}) * V_o(t - L_{13}/v_o) = V(t - t_{13}) \tag{9}$$

Therefore, the output signal $O_o(t)$ is $$O_o(t) = [V_o(t-t_{12}) + V_o(t-t_{13})]/2 = [A_o(t-t_{12}) \cdot e^{iw_o*(t-t_{12})} + A_o(t-t_{13})e^{iw_o*(t-t_{13})}]/2 \tag{10}$$

The time differential $$t_d = t_{12} - t_{13} \tag{11}$$

is typically selected to be on the order of $1/w_o$ which is on the order of $10^{-15}$ s whereas $t_{12} = L_{12}/v_o$ is on the order of $(10^{-2})m/(10^8 m/s) = 10^{-10}/s$. Since $A_o(t)$ typically varies at 20 GHz or less, we have that $A_o(t - t_{12})$ is substantially equal to $A_o(t - t_{13})$. Thus, $$O_o(t) = A_o(t - t_{12}) * e^{iw_o*(t - t_d/2)} * \cos(w_o * t_d) \tag{12}$$

Figure 7:
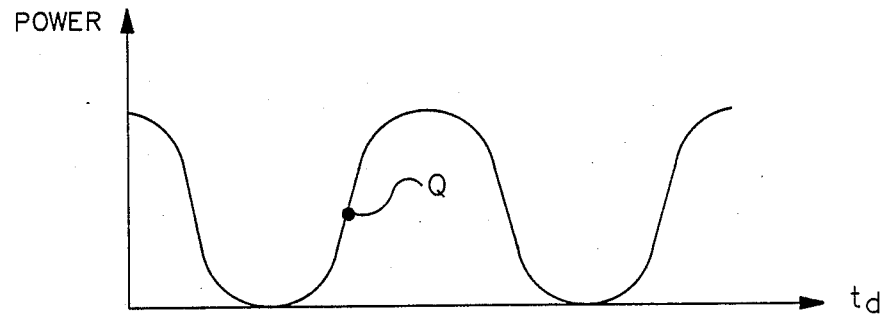
FIG. 7 illustrates the output power curve as a function of the time delay difference $t_d$ and illustrates the choice of bias to achieve linear variation of the output power as a function of the applied voltage $V_a$.

Therefore, the power $O_o(t) * O_o^*(t)$ produced by an optical detector that is responsive to $O_o(t)$ will be $[A_o(t-t_{12})]^2 * \cos^2(w_o * t_d)$. This has the form shown in FIG. 7.

In response to the applied signal, $t_{12}$ and $t_{13}$ will be varied by amounts that are on the order of $1/w_o$. This will produce variations in the output power from the optical detector. In order to make these variations in power substantially linear in the applied voltage signal, $t_d$ is chosen to bias the output power signal at a linear point of the power curve. Thus, $t_d$ is chosen to be an odd multiple of $\tfrac{1}{2} w_o$. This time difference can be produced by a pathlength difference between $L_{12}$ and $L_{13}$ sufficient to produce this value of $t_d$. This will be referred to as a geometric bias. Likewise, this value of $t_d$ can be produced by a constant bias potential difference between electrodes 15-17. This will be referred to as a voltage bias.

The effect of the applied voltage travelling wave $V_a(t - z/v_a)$ can be understood by its effect on the light in branch 12. In the region of the modulator between ends 108 and 110 of the electrodes, the applied voltage produces an electric field that increases the transit time of a given point of the optical travelling wave by an amount $T_{12}(t - L_{12}/v_o)$ proportional to the time integral of the electric field experienced by that point of the optical travelling wave. Thus, at the modulator output at time t (i.e., at spacetime point $(t, L_{12})$), the optical signal in branch 12 has the form $$A_o(t - L_{12}/v_o) * e^{iw_o * [t - L_{12}/v_o + T_{12}(t - L_{12}/v_o)]} \tag{13}$$

where $T_{12}(t - L_{12}/v_o)$ is proportional to the integral over time of the electric field experienced by the portion of the optical signal that reaches $z = L_{12}$ at time t. The portion of the optical wave arriving at the output point $z = L_{12}$ at time t travels in branch 12 along the spacetime path $$z = z_o(t') = L_{12} + v_o * (t' - t) \tag{14}$$

This portion of the optical wave experiences at time t' the electric field at the spacetime point $(t', z_o(t'))$—namely, an electrical field proportional to $$g(z) * V_a(t - z/v_a) \tag{15}$$

where g(z) is the field polarity reversal pattern produced by the electrode structure. The function g(z) is zero outside of the interval $(L_{18}, L_{18}+L)$ and within this interval has values $+1$ or $-1$ in accordance with a spread spectrum pseudorandom code. Since the optical wave travels at substantially constant velocity $v_o$, this time integral can also be written, using equation (7), as an integral over $z_o$:

$$\begin{aligned} T_{12}(t - L_{12}/v_o) &= S*g[z_o(t')]*V_a[t' - z_o(t')/v_a]dt' \\ &= S*g[z]*V_a[(t + \{z - L_{12}\}/v_o) - z/v_a]dz \\ &= h(s)*V_a(t - t_{12} - s)ds \end{aligned} \quad (16)$$

where $t_{12}=L_{12}/v_o$, where S is a response strength factor that takes into account the distance between the electrodes, the geometric arrangement of the electric fields produced by the electrodes through waveguides 12, and the electrooptic responsivity of the modulator waveguides, where $s=z_o*(1/v_a-1/v_o)+t_{12}$ and where $h(s)=Sg(z_o)$. This can be reexpressed as the convolution $$T_{12}(t-t_{12})=(h \otimes V_a)(t-t_{12}) \quad (17)$$

Aside from a scale factor, $h(s)$ has the same functional shape as the electric field reversals produced by the electrode shape. In addition, $h(s)$ is also the impulse response of this modulator. This can be seen by letting the applied voltage be a delta function voltage pulse, then equation (10) implies that $T_{12}(t)=h(t-t_{12})$. Thus, $w_o*h(t-t_{12})$ is indeed the phase modulation response of the modulator to a delta function voltage pulse.

The frequency response of this modulator is obtained by Fourier transforming equation 11. Since the Fourier transform of a convolution of two functions is the product of the Fourier transform of each of these functions, the frequency response of the modulator for the light in branch 12 is $$\tilde{T}_{12}(w)=\tilde{h}(w)*\tilde{V}_a(w) \quad (18)$$

where the tilde denotes the Fourier transform function of the corresponding time domain function.

For a sinusoidal applied voltage of frequency w (i.e., for $\tilde{V}_a(w)=\delta(w-w_o)$), $\tilde{T}_{12}(w)=\tilde{h}(w)$. Therefore, in order to increase the bandwidth of the system while retaining operation down to dc values (i.e., w=0), we need to keep $\tilde{h}(w)$ reasonably flat over an increased range that extends down to w=0. As discussed above $h(s)=Sg(z_o)$, $s=z_o*(1/v_a-1/v_o)+t_{12}$, and $g(z_o)$ is a step function that is zero outside of the interval $(L_{18}, L_{18}+L)$ and within that interval is equal to $+1$ or $-1$ as determined by a spread spectrum pseudorandom code.

In accordance with the present invention, it is expected that electrodes that produce parity reversals in accordance with a spread spectrum pseudorandom code will produce an increased bandwidth because such codes exhibit a broad spectrum, which is why they are referred to as spread spectrum codes. Such codes are widely used in radar and communications. Unfortunately, in many of such applications, the codes are intentionally selected to discriminate against dc signals. Such codes would thus be unsuitable in modulators for which dc operation is required. However, such codes can be used to expand the bandwidth in modulators that do not need to operate down to dc.

In the following, such a code having N elements will be denoted by $\{g_o, \ldots, g_{N-1}\}$ where each $g_k$ is equal to $-1$ or $-1$. The function $g(z)$ can be expressed in terms of the $g_k$ and the function $$g_{chip}(z) = \begin{cases} 1 & \text{if } 0 \leq z \leq L/N \\ 0 & \text{otherwise} \end{cases} \quad (19)$$

The function $g_{chip}(z)$ is thus a step function of unit height and of length equal to the length of a section of electrode whose polarity is determined by one element in the code. Thus, $g(z)$ has the form $$g(z) = \sum_{k=0}^{N-1} g_k*g_{chip}[(z - L_{18} - k*L/N)] \quad (20)$$

where $L_{18}$ is the distance from the input of waveguides 11 to the point in branch 12 located at end 18 of the electrodes. This can be rewritten as the convolution $$g(z)=(a \otimes g_{chip}) \quad (21)$$

where $$a(z) = \sum_{k=0}^{N-1} g_k \delta(z - L_{18} - k*L/N) \quad (22)$$

is referred to herein as the array factor. Because equation (21) is a convolution, its Fourier transform is $$\tilde{g}(w)=\tilde{a}(w)*\tilde{g}_{chip}(w) \quad (23)$$

The function $\tilde{g}_{chip}(w)$ is easily evaluated and is equal to $(1/N)\text{sinc}(w/N)$. This has the same functional shape as $\tilde{h}(w)$ for electrodes having no polarity reversals, but is N times wider. Thus, if the term $\tilde{a}(w)$ in equation (23) can be made reasonably constant over the bandwidth of the term $\tilde{g}_{chip}(w)$, then the bandwidth of this modulator will be N times wider than the bandwidth of a Mach-Zehnder modulator having no polarity reversals along the electrodes.

Because the detector is responsive to the modulation of the incident intensity of the optical signal, it follows that the electrically detected power at frequency w is proportional to the absolute square of $\tilde{a}(w)$. Thus, we need a code that makes the absolute square of $\tilde{a}(w)$ substantially constant over the bandwidth of $\tilde{g}_{chip}(w)$. Since the Fourier transform of a delta function is constant and since the absolute square of $\tilde{a}(w)$ is equal to the Fourier transform of the autocorrelation of $a(t)$, the pseudorandom code that is used should have a large central peak with very small sidelobes. Barker codes are known to have such characteristics. In particular, Barker codes have sidelobes that are $-1$, 0, or $+1$ (see, for example, R. H. Barker, "Group synchronization of binary digital systems" in W. Jackson, Ed., *Communication Theory*, Academic Press, New York, 1953). Thus, the bandwidth can be increased by a factor on the order of N by use of a Barker code of length N.

Unfortunately, some choices of the particular Barker code to be used significantly degrade modulator performance for a dc applied voltage signal. Thus, for those modulators that should operate down to dc, such codes should not be used. The amplitude of modulation with a dc applied voltage is proportional to $a(0)$ which is proportional to the sum of the $g_k$. Thus, those codes that have a substantially equal number of $+1$ and $-1$ terms have poor dc performance. On the other hand, if substantially all of the terms are either just +1 or just −1, then the characteristics will be similar to a modulator with no polarity reversals. This suggests that approximately ¼ of the terms have one sign and ¾ should have the opposite sign. Those Barker codes that satisfy these criteria are the codes of length 4, 5 and 13. These codes are presented in FIG. 8.

In order to select among the possible codes, a criterion is needed to define performance. Since it is desired to have improved bandwidth and have good modulation down to dc applied voltages, the figure of merit that is used is the product of the dc gain (which is equal to h(0)) times the 5 dB bandwidth. This figure of merit is proportional to the bandwidth-to-voltage ratio discussed previously.

The first of the four Barker codes presented in FIG. 8 produces at best a modest improvement in the figure of merit compared to the figure of merit for a conventional Mach-Zehnder modulator. In the reference by Djupsjobacka discussed in the Background of the Invention, a modulator that is the same as one designed according to the present invention utilizing the first Barker code in FIGS. 8A-8D. This reference indicates a 30% increase in the figure of merit compared to a conventional modulator, but our calculations indicate that it is more like a slight decrease in the figure of merit by a factor of 0.95 when the right microwave and optical indices are used in the calculations.

Computer simulations and experimental data have been used to compare the responses of devices having electrodes configured according to the Barker Codes of FIGS. 8A-8D against a conventional device of the same dimensions. These devices shared the following common characteristics: (1) active length L is 1 cm; (2) center conductor width W is 30 microns; (3) characteristic impedance $Z_o$ is 22 Ohms; (4) the optical wavelength is 1.3 microns; (5) the optical index is 2.148; (6) the index for the applied voltage is 4.225. The bandwidths for the conventional device and for the devices using the codes of FIGS. 8A-8D are 10.6 GHz, 18.3 GHz, 41.5 GHz, 43.1 GHz and 111.03 GHz, respectively.

Since $V_{pi}$ is the dc voltage needed to produce a phase change of pi in the optical signal and since for dc applied voltage, the electric fields experienced by the optical wave have the same form as the Barker Code for that device, the average electric field experienced by the optical signal in such a device is proportional to $(n_+ - n_-)/(n_{30} + n_-)$, where $n_+$ is the number of pluses in the code and $n_-$ is the number of minuses in the code. Therefore, the value of $V_{pi}$ in these devices is increased by the amount $(n_+ + n_-)/(n_+ - n_-)$ compared to the conventional device. For the first through fourth devices in FIGS. 8A-8D, these values are 2, 2, 5/3, and 13.9, respectively. The bandwidth-to-voltage ratio (using a 5 dB criterion for bandwidth) for the first through fourth devices relative to the conventional device are thus 0.86, 1.95, 2.03 and 4.02, respectively. Thus, any of the three codes in FIGS. 8B-8D produces an increase of at least 1.5 times the figure of merit of a conventional Mach-Zehnder modulator. The Barker code of length 13 exhibits the largest improvement. In FIG. 10 is illustrated the electrode pattern implementing that code. It should be noticed that phase reversals in accordance with a code that is the same as one of these codes, but reversed in order, will have a comparable bandwidth-to-voltage ratio. However, when modulator losses are not negligible, it has been found that a somewhat improved bandwidth-to-voltage ratio is achieved for the choice of order that locates a greater number of phase reversals near the input end of the modulator than near the output end. One exception to this is the code of length four shown in FIG. 8B. However, in the following, when we refer to the Barker code of length N, we will be referring generically to both choices of code ordering.

There are also generalized Barker codes of length M*N that are generated as the outer product of a Barker code of length M and a Barker code of length N. This outer product is illustrated in FIG. 11 for the case of the outer product of the Barker code $\{+,-,+,+,+\}$ with the Barker code $\{+,+,-,+\}$. Each element in the first Barker code (shown in line (a)) is multiplied by a copy of the second Barker code (a copy of this code is shown in line (b) for each element in line (a)) and these multiplied copies are ordered as shown to produce the 20 element generalized code of line (c). Although these generalized Barker codes do not satisfy the requirement of Barker codes (that the sidelobes in their autocorrelation function have only values of −1, 0, or +1), they still have sidelobes that are much smaller than the main lobe. Such generalized Barker codes are also suitable for defining the pattern of polarity reversals in the modulator.

Other pseudorandom codes can also be used to improve this figure of merit. In FIG. 9 is presented an amplitude modulator that utilizes a pair of Mach-Zender modulators 91 and 92 having their electrodes configured in accordance with a Golay pair $\{G_1,G_2\}$ of pseudorandom codes. Modulator 91 has electrodes on its top branch 93 configured to produce polarity inversions in accordance with code $G_1$ and has its bottom branch 94 configured to produce polarity inversions in accordance with the negative of code $G_1$. This produces the push-pull phase behavior exhibited in the device in FIG. 1. Modulator 92 has electrodes on its top branch 95 configured to produce polarity inversions in accordance with code $G_2$ and has its bottom branch 94 configured to produce polarity inversions in accordance with the negative of code $G_2$.

The output optical signals from modulators 91 and 92 are each sequentially passed though an optical network 97 under test. The output optical signals from modulators 91 and 92 are detected by an optical detector 98. The output signal from detector 98 for each of modulator 91 and 92 is detected in a spectrum analyzer 910 to produce the Fourier transform of each signal. If the optical network has a transfer function $\bar{H}(w)$, then the Fourier transform of the signal from modulator 91 is $$\bar{H}(w)*\bar{a}_{91}(w)*\bar{g}_{chip}(w)*\bar{V}_a(w) \qquad (24)$$

and the Fourier transform of the signal for modulator 92 is $$\bar{H}(w)*\bar{a}_{92}(w)*\bar{g}_{chip}(w)*\bar{V}_a(w) \qquad (25)$$

where $\bar{a}_{91}(w)$ is the array factor for modulator 91 and $\bar{a}_{92}(w)$ is the array factor for modulator 92. Each of these Fourier transforms is supplied to a calculator 911 which adds the absolute square of these two signals to produce an output signal $\bar{o}(w)$ equal to $$\bar{o}(w) = |\bar{H}(w)|^2 * |\bar{g}_{chip}(w)|^2 * |\bar{V}_a(w)|^2 *$$
$$*[|\bar{a}_{91}(w)|^2 + |\bar{a}_{92}(w)|^2] \qquad (26)$$

In general, the absolute square of the Fourier transform of a function is equal to the Fourier transform of the autocorrelation of that function. Thus, the term in brackets is the Fourier transform of the sum of the autocorrelations of each of the array factors for modulators 91 and 92. Because these array factors are defined by Golay codes, by definition the sum of their autocorrelation functions is proportional to a delta function (see, for example, R. H. Pettit, "Pulse Sequence with Good Correlation Properties", Microwave Journal 63–67 (1967) and M. J. E. Golay, "Complementary Series", Proc. IRE 20 82–87 (1961). Therefore, the term in brackets is constant. As a result of this, the modulator bandwidth is just that of $\tilde{g}_{chip}(w)^2$. For a Golay code of N elements, this results in an increase by N of the bandwidth of the modulator compared to a conventional Mach-Zehnder modulator. However, for Golay codes, it can be shown that the balance between positive and negative bits is such that the ratio $(n_+ + n_-)/(n_+ - n_-)$ is proportional to the square root of N. Thus, $V_{pi}$ increases by a factor proportional to the square root of N so that the overall improvement in the bandwidth-to-voltage ratio increases as the square root of N.

Suitable Golay codes are presented in the references R. H. Pettit, "Pulse Sequences with Good Correlation Properties", Microwave Journal 63–67 (1967) and M. J. E. Golay, "Complementary Series", Proc. IRE 20 82–87 (1961). One particular set of Golay codes that are easy to generate for a length $L=2^{n-1}$ for some integer n are as follows. A Golay pair of length 1 is the pair of sequences $^1G^1_k = \{1\}$ and $^1G^2_k = \{1\}$. The superscript to the left of G indicates that this is a Golay code for $n=1$. Higher order values of n are generated by the following iteration:

$$^{n+1}G^1_k = \{^nG^1, ^nG^2\}_k \quad (15)$$

$$^{n+1}G^2_k = \{^nG^1, ^nG^{2*}\}_k$$

where $n^{G2*}$ is the conjugate of $^nG^2_k$. By conjugate is meant that each element in $^nG^{2*}$ is equal to minus the corresponding element in $^nG^2$. For example, for $n=3$, the sequences are:

$$^3G^1_k = \{1,1,1,-1\} \text{ and}$$

$$^3G^2_k = \{1,1,-1,1\}$$

Three other Golay pairs of length $2^n$ can be produced from this pair by reversing the polarity of all of the elements in: just $^nG^1_k$; just $^nG^1_k$; or in both $^nG^1_k$ and $^nG^2_k$.

We claim:

1. An improved travelling wave modulator of the type having a waveguide for carrying a first travelling wave, said modulator being responsive to a second travelling wave, travelling substantially parallel to the first travelling wave, to alter the phase velocity of the first travelling wave by an amount that, at each time and distance along the waveguide, is proportional to the second travelling wave at that time and distance along the waveguide, said improvement comprising:

means for reversing the polarity of the second travelling wave in a spatial pattern along the waveguide, wherein the pattern consists of a sequence of contiguous segments of substantially equal length and of total length L in each of which the polarity is defined by a spread spectrum code that produces an increase of at least 1.5 in 5 dB bandwidth-to-voltage ratios compared to an equivalent modulator in which all of the segments have the same polarity.

2. A modulator as in claim 1 wherein the spread spectrum code is a generalized Barker code.

3. A modulator as in claim 2 wherein the spread spectrum code is a Barker code.

4. A modulator as in claim 3 wherein the spread spectrum code is selected from the set of Barker codes consisting of: (1) $\{+,+,-,+\}$ of length 4; (2) $\{+,-,+,+\}$ of length 4; (3) $\{+,-,+,+,+\}$ of length 5; (4) $\{+,+,+,-,+\}$ of length 5; (5) $\{+,-,+,-,+,+,-,-,+,+,+,+\}$ of length 13; and (6) $\{+,+,+,+,+,-,-,+,+,-,+,-,+\}$.

5. A modulator as in claim 4 wherein the spread spectrum code is selected from the set of Barker codes consisting of: (1) $\{+,+,-,+\}$; (2) $\{+,-,+,+,+\}$; and (3) $\{+,-,+,-,+,+,-,-,+,+,+,+,+\}$.

6. A modulator as in claim 1 wherein the spread spectrum code is a Golay code.

7. A modulator as in claim 1 wherein, for a code of the form $\{c_0, \ldots, c_{N-1}\}$, where each $c_k$ ($k=0, \ldots, N-1$) equals $+1$ or $-1$ and wherein the segment whose polarity is $c_k$ has length $L_k$ where the sum of the $L_k$ equals the length L of application of the second travelling wave and wherein each $L_k$ is in the range $0.75*L \leq L_k \leq 1.25*L$.

8. A modulator as in claim 2 wherein, for a code of the form $\{c_0, \ldots, c_{N-1}\}$, where each $c_k$ ($k=0, \ldots, N-1$) equals $+1$ or $-1$ and wherein the segment whose polarity is $c_k$ has length $L_k$ where the sum of the $L_k$ equals the length L of application of the second travelling wave and wherein each $L_k$ is in the range $0.75*L \leq L_k \leq 1.25*L$.

9. A modulator as in claim 1 wherein, in at least one segment there is a narrow region of opposite polarity to the polarity of that segment and wherein this narrow region is shorter than one tenth the length of that segment.

10. A modulator as in claim 2 wherein, in at least one segment there is a narrow region of opposite polarity to the polarity of that segment and wherein this narrow region is shorter than one tenth the length of that segment.

* * * * *